United States Patent [19]
Belshaw et al.

[11] Patent Number: 5,645,195
[45] Date of Patent: Jul. 8, 1997

[54] DOUGH AND BATTER DISPENSER

[76] Inventors: Thomas E. Belshaw, 9727 - 45th Ave. SW., Seattle, Wash. 98136-2708; Frank W. Ebelle, 2323 N. 82nd Ave., Seattle, Wash. 98107; Christopher L. Bowers, 634 NW. 178th Pl., Seattle, Wash. 98177

[21] Appl. No.: 500,036

[22] Filed: Jul. 11, 1995

[51] Int. Cl.$^6$ ........................ B67D 5/32
[52] U.S. Cl. ............ 222/153.09; 222/440; 222/441; 222/449; 222/472
[58] Field of Search .............. 222/153.09, 162, 222/324, 440, 441, 448, 449, 450, 470, 472, 518

[56] References Cited

U.S. PATENT DOCUMENTS

| | | | |
|---|---|---|---|
| 2,637,282 | 5/1953 | Belshaw et al. | 107/14 |
| 2,825,494 | 3/1958 | Belshaw | 222/440 |
| 2,987,224 | 6/1961 | Chapman | 222/472 X |
| 3,120,328 | 2/1964 | Corsette et al. | 222/153.09 |
| 3,260,419 | 7/1966 | Weimer et al. | 222/472 X |
| 4,413,972 | 11/1983 | Lawson | 222/518 X |
| 5,462,203 | 10/1995 | Stern | 222/472 X |

*Primary Examiner*—Joseph Kaufman
*Attorney, Agent, or Firm*—Christensen, O'Connor, Johnson & Kindness PLLC

[57] ABSTRACT

In accordance with the present invention, an apparatus is provided for dispensing dough. The apparatus comprises a dough hopper (11) having a valve chamber (12) at its lower end into which dough from the hopper is metered and from which dough is eventually discharged by a valve unit (14). Dough is expelled from the valve chamber in response to downward strokes of a dispensing rod (30) attached to the valve unit. In the preferred embodiment, a dough former (72) is attached to the valve unit and is used to dispense multiple charges of dough. In an alternative embodiment, the valve unit is provided with a seat (27) having a discharge opening (19) through which dough is dispensed in a single charge.

37 Claims, 4 Drawing Sheets

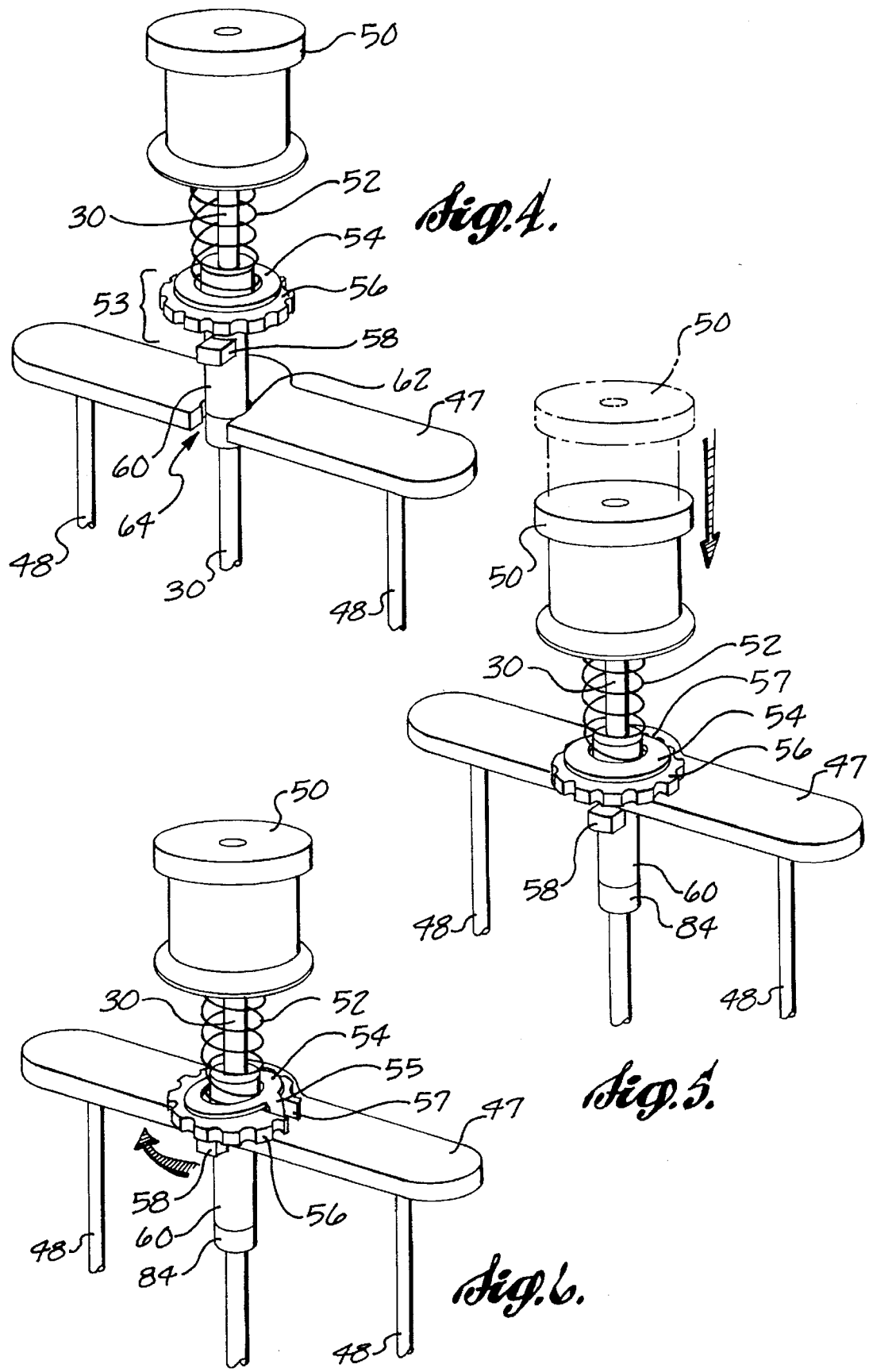

1

DOUGH AND BATTER DISPENSER

FIELD OF THE INVENTION

This invention generally relates to a batter and dough dispensing device, and more specifically, to a dispensing device capable of metering dough or batter in single or multiple charges.

BACKGROUND OF THE INVENTION

Dough and batter dispensers used to accurately dispense a single charge of dough or batter are known in the prior art. As described in U.S. Pat. No. 2,825,494, one type of dough dispenser includes a dough hopper having a valve chamber at its lower end through which dough from the hopper is metered and expelled by a valve unit. A rod connected to the valve unit is used to displace the valve unit so that the dough trapped in the valve chamber is expelled.

Known dough dispensers such as that described above are typically used in the commercial food industry to produce large volumes of pancakes, cakes, doughnuts, etc. Unfortunately, the known dough dispensers have proven incapable of withstanding the constant and repetitive use required of them in these environments. For example, the dough hopper will eventually become dented, bent or otherwise misshapen under constant use. As a result, the rod and valve unit of the dough dispenser are forced out of alignment. In some cases, the valve unit and rod become jammed so completely that the dough dispenser is no longer capable of discharging dough or is so impaired that dough leaks from the hopper. In a commercial environment where a large volume of food is produced, significant leakage can amount to a direct loss in productivity and profits. Further, leakage may also result in a messy, unsanitary food preparation environment.

Problems with alignment and leakage aside, the known dough dispensers are only capable of expelling one charge of dough at a time. This limits the type and number of uses for which the dough dispenser may be employed commercially.

Accordingly, there is a need for a durable dough dispensing device that can be used in the commercial food industry, wherein the dispensing device will accurately and efficiently dispense multiple charges of dough with minimal waste.

SUMMARY OF THE INVENTION

In accordance with the present invention, an apparatus is provided for dispensing dough. The apparatus comprises a dough hopper having a discharge chute at its lower end into which dough from the hopper is metered and from which dough is eventually discharged by a valve unit. Dough is expelled from the valve chamber in response to downward strokes of a reciprocating dispensing rod attached to the valve unit. The valve unit is slidably mounted within the discharge chute such that a valve chamber is defined between the valve unit, the discharge chute and a plate provided at the lower end of the discharge chute.

The valve unit includes a valve chest that reciprocates through a hole defined through the plate. The valve chest comprises an inlet in fluid communication with the valve chamber and an outlet through which dough is discharged. In addition, a pair of integrally formed, opposing arms extend upwardly from an upper end of the valve chest. The valve unit also includes a check valve that alternatively opens and closes in response to the reciprocating movement of the dispensing rod and a plunger valve housed within the valve chest adapted to meter the flow of dough through the outlet of the valve chest. In a preferred embodiment of the present invention, each arm includes a hook mounted upon a shoulder, the hook of one arm facing in a direction opposite the hook of the opposing arm. A clip provided for attaching the dispensing rod to the valve unit extends through the hook of each arm such that the ends of the clip bear against the arms in opposing directions.

In another embodiment, a dough former is coupled to the outlet of the valve chest for dispensing the dough in multiple portions. The dough former includes a body surrounding a well for receiving dough from the outlet of the valve chest. The body includes an upper edge that engages the plunger valve to close the outlet of the valve chest. In addition, a plurality of dispensing arms for dispensing multiple charges of dough extends outwardly from the body.

In an alternative embodiment, the outlet of the valve chest is provided with a seat including a discharge opening. In this embodiment, the plunger valve cooperates with the seat to dispense a single charge of dough.

In accordance with other aspects of the invention, a handle assembly is provided through which the rod extends and is centered within the hopper. In addition, the dispensing rod is secured to the handle assembly by a locking mechanism.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 4, 5 and 6 are isometric views of a locking mechanism with which the dough dispenser of FIG. 1 is equipped.

DETAILED DESCRIPTION OF THE PREFERRED EMBODIMENT

Figure 1:
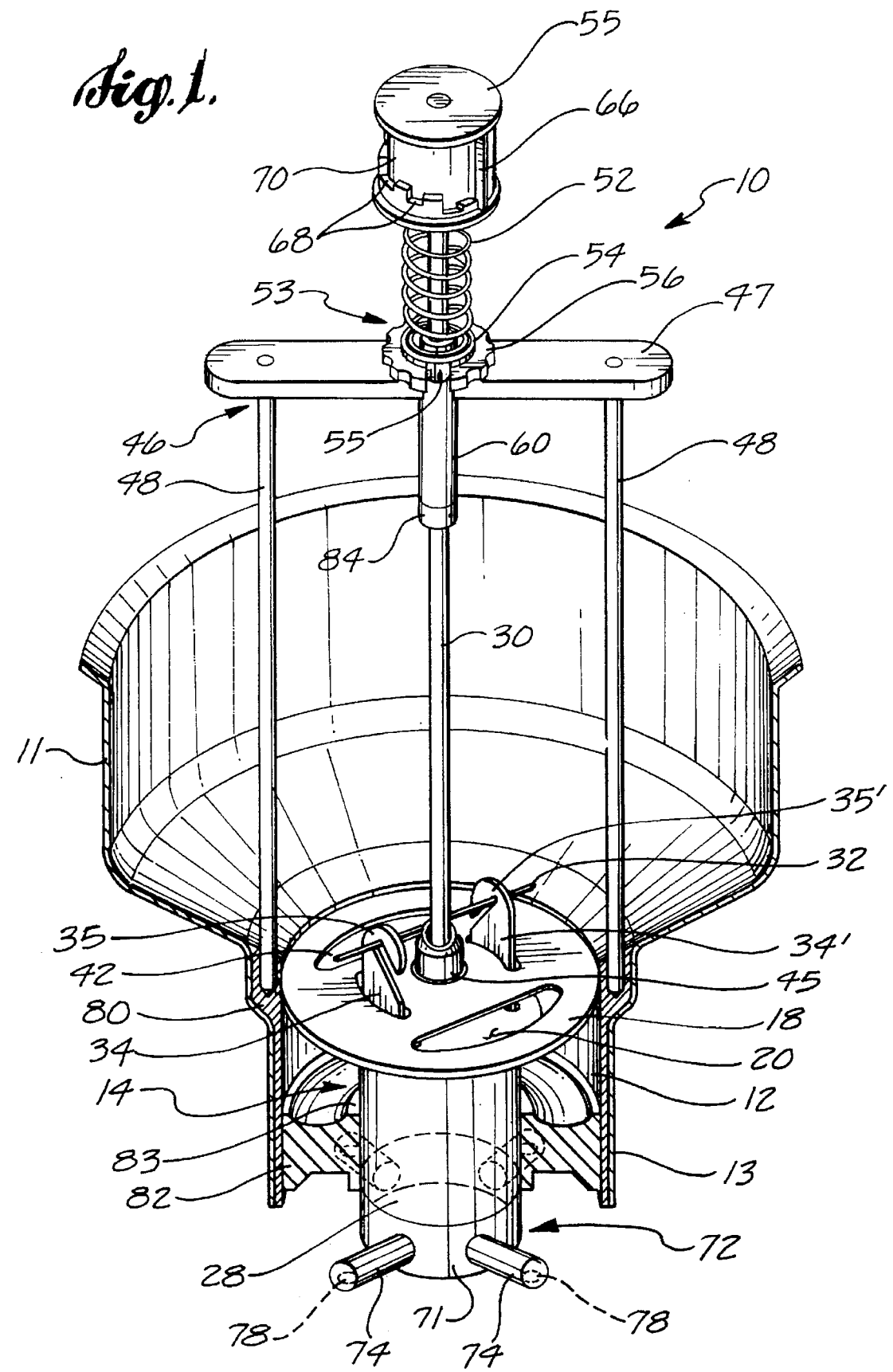
FIG. 1 is a perspective view, with portions cut away, of a dough dispenser formed in accordance with a preferred embodiment of the present invention.

As shown in FIG. 1, a dough dispenser 10 is provided for accurately dispensing and metering a charge of dough of the thinner viscosities, such as the dough or batter used for cupcakes, pancakes, etc. The dough dispenser 10 comprises a cylindrical dough hopper 11 having a valve chamber 12 at its lower end into which dough from the hopper is metered and from which dough is eventually discharged by a valve unit 14. Dough is expelled from the valve chamber 12 in response to downward strokes of a rod 30 attached to the valve unit 14. In the illustrated embodiment, the dough dispenser is equipped with a dough former 72 attached to the valve unit 14 that is used to divide and dispense the dough metered into the valve chamber 12 into smaller, multiple portions. For example, if the dough dispenser 10 is used to dispense pancake batter, the dough former 72 is used to divide the charge of batter metered into the valve chamber 12 into smaller portions, forming what is commonly referred to as "dollar-size" pancakes. In the preferred embodiment of the present invention, the dispenser 10 and most of its components are made of stainless steel. However, it will be readily apparent to those of ordinary skill in the art that any strong, rust-resistant material, such as high-density plastic, or other metal or metal alloy, may suitably be used.

The dough hopper 11 of the dough dispenser 10 serves as a refillable repository for dough during food preparation. The upper end of the dough hopper 11 is flared outwardly making the hopper easier to fill and serving as a splash guard. The hopper 11 narrows at its lower end to form a discharge cylinder 13 or chute in which the valve unit 14 is properly aligned and housed such that the valve unit 14 may reciprocate within the discharge cylinder in unison with the rod 30. However, if the discharge cylinder 13 is bent, dented or otherwise damaged, the valve unit 14 may be forced out of alignment with the discharge cylinder 13, causing significant leakage or complete malfunction of the dispenser. Consequently, a tubular insert 80 having a diameter slightly smaller than that of the discharge cylinder 13 and a length equal to that of the discharge cylinder is inserted and fixed within the discharge cylinder such that its upper end fits flush with the bottom of the dough hopper 11. The insert 80 reinforces the discharge cylinder 13 making it increasingly difficult to bend, dent or otherwise damage. Consequently, the insert 80 prevents the valve unit 14 from being forced out of alignment. The lower end of the insert 80 and discharge cylinder 13 is fitted with an annular plate 82 having a hole 83 defined through its center. The walls of the valve chamber 12 are thus formed by the annular plate 82, the insert 80 and the valve unit 14. As will be described in more detail below, the valve unit 14 reciprocates through the hole 83 of the annular plate in response to the reciprocating strokes of the rod 30.

Figures 2A, 2B:
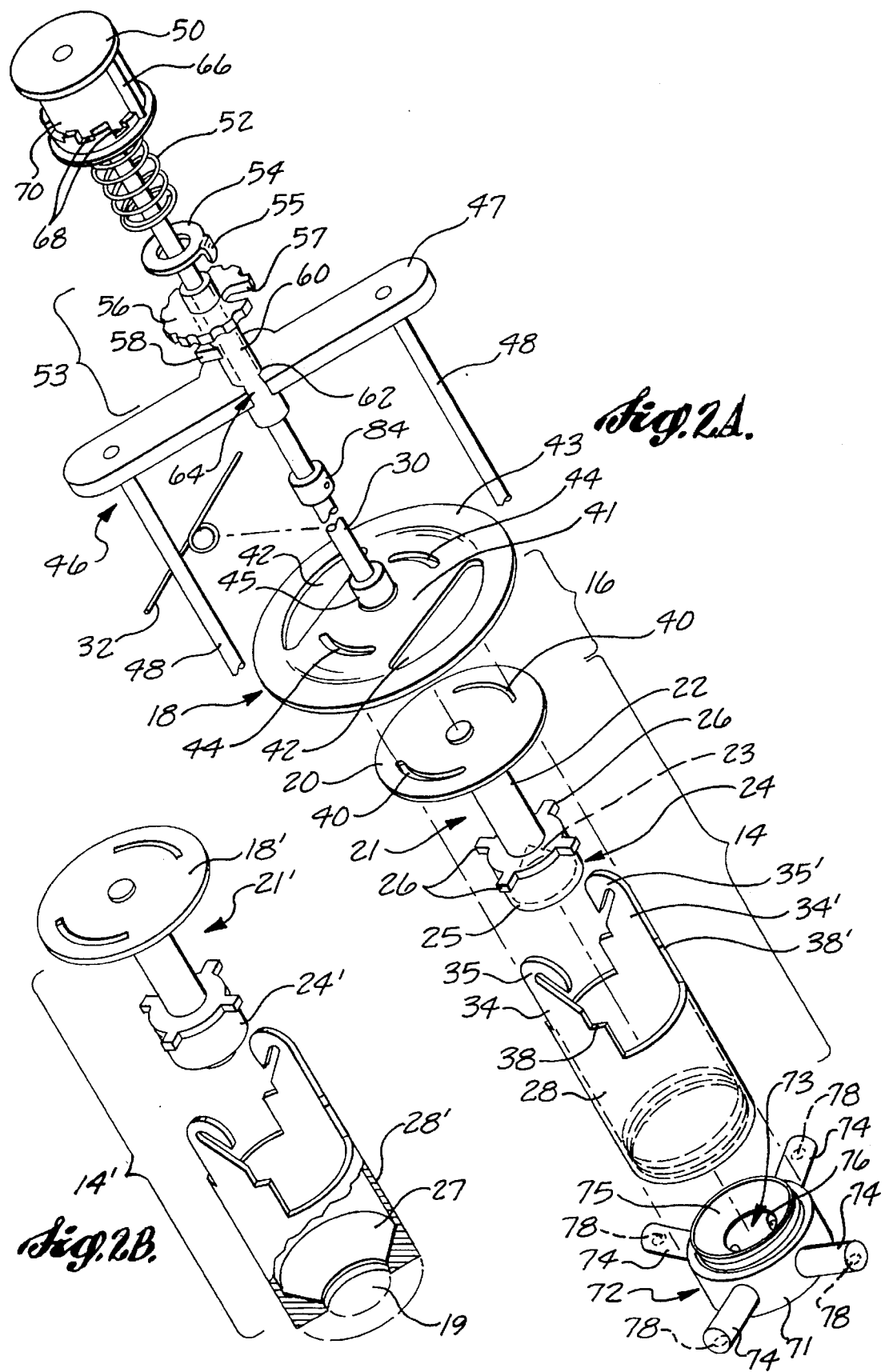
FIG. 2A is an exploded view of a valve unit with which the dough dispenser of FIG. 1 is equipped.
FIG. 2B is a fragmented view of an alternative embodiment of the valve unit.

As shown in FIG. 2A, in the preferred embodiment of the present invention, the valve unit 14 comprises a valve chest 28, a plunger 21 and a valve plate 18. The valve chest 28 is cylindrical in shape and has a diameter slightly smaller than that of the hole 83 of the annular plate 82 so that the valve chest 28 may reciprocate through the hole 83 in response to reciprocating strokes of the rod 30. A pair of arms 34 and 34' extend upwardly from the open, upper end of the valve chest 28. In addition, the arms 34 and 34' are integrally formed from the valve chest 28 thus providing the arms and valve chest with greater stability and strength, and ensuring proper alignment. In accordance with the cylindrical shape of the valve chest 28, each arm 34, 34' has an arcuate cross-section. Arm 34 includes a shoulder 38 from which a hook 35 extends. Arm 34' is located on the opposite side of the valve chest 28 and also includes a shoulder 38' from which a hook 35' extends. However, the hook 35' of opposing arm 34' faces in a direction opposite that of hook 35 of arm 34. As described in more detail below, the hooks 35, 35' of each arm 34, 34' are used to hold the valve plate 18, the plunger 21 and the valve chest 28 together.

The valve plate 18 is circular in shape having a diameter slightly smaller than the tubular insert 80 so that the valve plate 18 may reciprocate through the insert 80 is response to reciprocating strokes of the rod 30. The valve plate 18 includes an upwardly dished cross-piece 41 that bridges an annular rim 43. On either side of the cross-piece 41, is a peripheral cutout 42 through which dough is metered from the hopper 11. A pair of arcuate arm slots 44 are defined through the cross-piece 41 for receiving the arms 34, 34' of the valve chest 28 when the valve unit 14 is assembled. Finally, the cross-piece 41 is mounted to a hub 45 which is attached to the lower end of the rod 30

The plunger 21 includes a plunger valve 24 having a cylindrical outer surface 25 and a conical inner surface 23. Four guide fingers 26 for constantly centering the plunger valve 24 within the valve chest 28 extend radially from the outer surface 25 of the plunger valve 24. The lower edge of the plunger valve 24 is beveled so as to cooperate with the dough former 72 as described below. A plunger stem 22 extends upwardly from the plunger valve 24 and terminates at a circular plunger plate 20. The plunger plate 20 includes a pair of slightly arcuate slots 40, through which the arms 34 and 34' of the valve chest 28 extend when the valve unit 14 is assembled.

Figure 3:
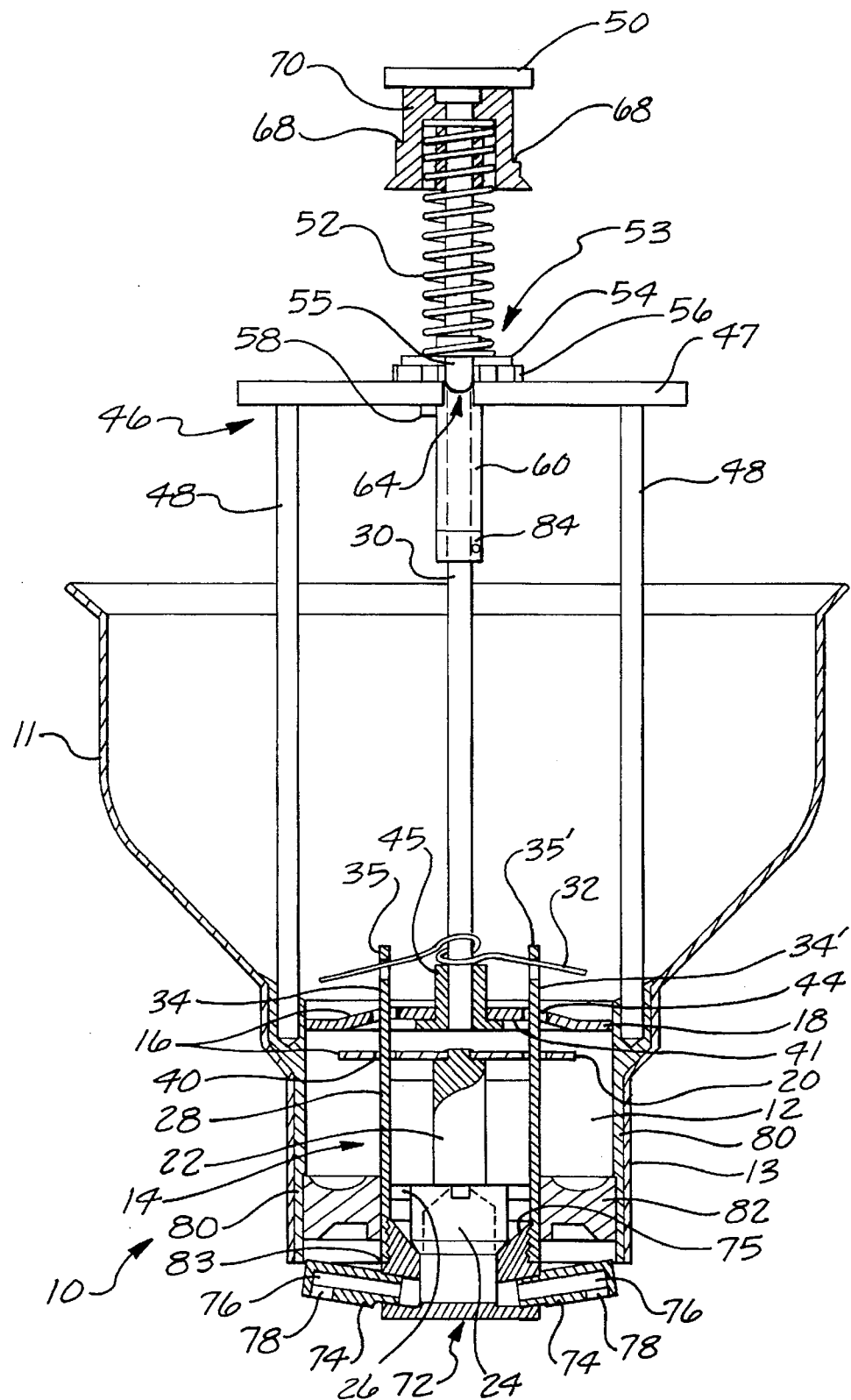
FIG. 3 is a cross-sectional view of the dough dispenser illustrated in FIG. 1.

As depicted in FIGS. 1 and 3, when the valve unit 14 is assembled, the plunger valve 24 and plunger stem 22 are inserted within the valve chest 28 such that the guide fingers 26 of the plunger member engage the inner surface of the valve chest and center the plunger valve and stem within the valve chest 28. The arms 34 and 34' of the valve chest extend through the arcuate slots 40 of the plunger plate 20 such that the plunger plate rides upon the shoulder 38, 38' of each arm 34, 34'. The arms 34 and 34' of the valve chest 28 also extend through the arm slots 44 of the valve plate 18. Consequently, the plunger plate 20 is allowed to float on the arms 34 and 34' between the shoulders 38 and 38' of the arms and the valve plate 18 such that the plunger plate 20 cooperates with the valve plate 18 to form a check valve 16 that controls the flow of dough from the hopper 11 into the valve chamber 12.

In this regard, the diameter of the plunger plate 20 is smaller than that of the valve plate 18 but large enough to extend beyond the cutout slots 42 of the valve plate. In addition, the length of the plunger stem 22 is less than the distance between the valve plate 18 and the lower end of the valve chest 28 so that the plunger plate 20 is allowed to float between the valve plate and the upper end of the valve chest 28. Consequently, the check valve 16 formed by the plunger plate 20 and the valve plate 18 is in a closed position, when the upper surface of the plunger plate 20 floats upwardly and engages the lower surface of the valve plate 18, completely covering the cutout slots 42 of the valve plate and stopping the flow of dough therethrough. When the check valve 16 is in an open position, the plunger plate 20 and the valve plate 18 are separated, allowing dough to flow through the cutout slots and into the valve chamber 12. Further, because the plunger plate 20 is circular with a diameter smaller than that of the valve plate 18, plunger plate 20 does not impinge the interior surface of the insert 80 of the discharge cylinder 13. Therefore, the plunger 21 can easily and rapidly move from the open to the closed position and vice versa.

The entire valve unit 14 is held together and secured to the rod 30 by a wire spring clip 32 which wraps around the rod 30, bears against the upper end of the hub 45 and engages the hook 35, 35' of each arm 34, 34'. More specifically, each end of the wire spring clip 30 is inserted into the hook 35, 35' of each arm 34, 34'. Since the hooks 35, 35' of each arm 34, 34' face in opposite directions, the spring clip 32 bears against the arms 34, 34' in opposing directions and balances the valve plate 18, plunger 21 and valve chest 28 within the discharge cylinder 13. Consequently, lateral movement of the valve unit 14 within the discharge cylinder 13 is minimized and proper alignment of the valve unit 14 within the discharge cylinder 13 is maintained.

Once the valve unit 14 and rod 30 are inserted in the hopper 11, the dough former 72 is attached to the valve unit beneath the annular plate 82. As shown in more detail in FIGS. 2A and 3, the dough former 72 includes a cylindrical body 71 having a well 73 for receiving dough from the valve chest 28. The upper end of the body 71 comprises a beveled edge 75 that is threaded to attach to the lower, cooperatively threaded end of the valve chest 28. However, those of ordinary skill in the art will recognize that means other than threads may be used to attach the dough former to the valve chest 28. When attached to the valve chest 28, the dough former 72 receives dough from the valve chest 28 only when the plunger valve 24 of the valve unit 14 is in an open position and the well 73 of the former 72 is in fluid communication with the interior of the valve chest 28, i.e., when the lower, beveled edge of the plunger valve does not engage the beveled edge 75 of the dough former 72. Conversely, the flow of dough into the well 73 is interrupted when the plunger valve 24 is in a closed position, i.e., when the plunger valve 24 engages the beveled edge 75.

When the plunger valve 24 is open, dough flows into the well 73 of the dough former 72 and is dispensed through the four dispensing arms 74 which extend radially from the body 71 of the dough former 72. Each arm 74 includes a dispensing duct 76 defined longitudinally through its center that is in fluid communication with the well 73 such that dough flows from the well into each of the dispensing ducts. Consequently, the dough discharged into the former 72 flows into the dispensing ducts 76 and is divided into four smaller portions. Each dispensing arm 74 is provided with a circular opening 78 defined through the lower surface toward its outer end through which the dough is ultimately expelled. Preferably, each dispensing arm 74 is inclined at an angle of approximately 10° so that the traces of dough remaining at the end of discharge recede down the dispensing duct 76 and do not drip through the dispensing opening 78. One of ordinary skill in the art will recognize that the angle of inclination may be modified as necessary to suit the type of dough being dispensed or the use to which the dispenser is being put. Although exactly four dispensing arms are depicted in the illustrated embodiment, it is readily appreciated that the dough former may include any number of dispensing arms as may be conveniently disposed along the circumference of the dough former's body 71.

In an alternative embodiment of the present invention, a dough former 72 is not provided. Rather, a valve unit 14' is provided including a valve chest 28' and a plunger 21' as shown in FIG. 2B. The lower end of a valve chest 28' is provided with an annular beveled seat 27 surrounding a discharge opening 19 through which the dough is ultimately expelled in a single charge. The plunger 21' includes a plunger valve 24' having a lower, beveled edge that cooperates with the beveled seat 27 to open and close the discharge opening 19. In the closed position, the plunger valve 24' engages the beveled seat 27, stopping the flow of dough through the discharge opening 19. In the open position, the plunger valve 24' is separated from the beveled seat 27, allowing the dough to flow through the discharge opening 19. Those of ordinary skill in the art will recognize that the remaining components of the valve unit 14' of the alternative embodiment are virtually identical to those of valve unit 14 of the preferred embodiment described above. Further, it will be appreciated that the manner in which the dough dispenser 10 and valve unit 14' are assembled and operated is the same as that of the valve unit 14. Thus, the remaining components, assembly and operation of the valve unit 14' the dough dispenser 10 will not be described in detail.

Referring now to FIGS. 2A and 3, the rod 30 and valve unit 14 are aligned with the discharge cylinder 13 in the center of the dough hopper 11. The rod 30 and valve unit 14 are maintained in alignment by a handle assembly 46 through which the rod 30 is centered. The handle assembly 46 includes an oval-shaped handle 47 having a circular opening 62 defined through its center through which the rod 30 extends. A channel 64 is defined through the handle 47 and intersects the opening 62. A pair of stabilizing rods 48 extend downwardly from either end of the handle 47 and terminate in the tubular insert 80 at the bottom of the hopper 11. Since the handle assembly 46 is secured to the insert 80 as opposed to the hopper 11 and the rod 30 is bolstered by the stabilizing rods 48 on either side, damage to the hopper 11 will not cause the rod or valve unit to move out of alignment with the discharge cylinder 13.

The rod 30 has a knob 50 at its upper end that is forced downwardly by the user to create a downward stroke of the rod 30. The knob 50 includes a flat upper surface to facilitate gripping of the knob. The knob 50 is yieldingly urged upwardly by a spring 52 the upper of end of which resides within the knob 50. Specifically, the spring 52 surrounds the rod 30 and is seated upon a locking mechanism 53 used to secure the rod 30 to the handle 47. Upward movement of the rod 30 with respect to the hopper 11 due to the action of the spring 52 is limited by a collar 84 which bear against the lower end of a sleeve 60 through which the rod 30 is journalled for reciprocating movement. This collar can be permanently pinned in position on the rod, or it can be adjustably mounted upon the rod to vary the upward movement of the rod 30.

To secure the rod 30 to the dough dispenser 10 and ensure alignment of the rod 30 and the valve unit 14, the rod 30 is inserted into the circular opening 62 of the handle 47 and locked in place by a locking mechanism 53 as shown in FIGS. 4, 5, and 6. The locking mechanism 53 includes a locking ring 54 having a locking tab 55, and a guiding ring 56 and key 58 mounted to the sleeve 60. The locking ring 54 engages the guiding ring 56 mounted near the upper end of the sleeve 60 such that the upper end of the sleeve 60 extends through the locking ring 54 and the locking tab 55 extends through a slot 57 intersecting the guiding ring 56. The key 58 is spaced below the guiding ring 56 at a distance slightly greater than the thickness of the handle 47.

To secure the rod 30 to the handle 47, the rod 30 and surrounding sleeve 60 are lowered through the circular opening 62 such that the key 58 passes through a channel 64 intersecting the circular opening 62 of the handle 47 as shown in FIGS. 4 and 5. It will be appreciated that as the rod and sleeve are lowered through the opening 62 of the handle 47, the valve unit 14 is lowered into the tubular insert 80 of the discharge cylinder 13. As shown in FIG. 5, the knob 50 is then forced downwardly compressing the spring 52 such that the guiding ring 56 makes contact with the handle 47 and the key 58 passes entirely through the thickness of the handle 47. Correspondingly, the locking ring 54 and locking tab 55 are displaced upwardly with respect to the guiding ring 56 as shown in FIG. 6. The guiding ting 56 is then rotated such that the key 58 passes beneath the handle 47 until the locking tab 55 drops into the slot 57 of the guiding ting 56 and the channel 64 of the handle 47. Once in this position, the rod 30 and valve unit 14 are locked in proper alignment with the discharge cylinder 13 through the center of the dough hopper 11.

To remove the rod 30 from the handle 47 so that the valve unit 14 may be disassembled and cleaned, the guiding ting 56 is forced to rotate such that the locking tab 55 of the locking ring 54 pops out of the channel 64 defined through the handle 47. As the guiding ring 56 and the locking ring 54 continue to rotate, the key 58 passes beneath the handle 47 until it reaches the channel 64. The rod 30 and valve unit 14 are then lifted upwardly such that the key 58 passes through the channel 64 and the sleeve passes through the circular opening 62. Finally, the rod 30 is passed through the channel 64 and removed.

The amount of dough discharged by the dough dispenser 10 can be selectively metered. More specifically, the knob 50 has a depending pin 66 for selectively nesting in a plurality of radial grooves 68 provided by a dial 70 which is free to turn relative to the rod 30. The deeper the groove 68 is, the greater downward movement of the rod 30 is allowed and the greater amount of dough is discharged. Typically, such grooves are evenly spaced about the periphery of the dial at depths that vary in a linear progression. However, in the preferred embodiment of the present invention the depths of the grooves 68 vary in a nonlinear progression.

Now that the construction of the dough dispenser 10 has been described, the operation of the dough dispenser will be fully considered. As dough is metered from the hopper 11 into the discharge cylinder 13, the dough is trapped within the valve chamber 12 formed between the check valve 16, the valve chest 28, the insert 80 and the annular plate 82. When the rod 30 is at the top of its stroke and the hopper 11, valve chamber 12 and valve chest 28 are full of dough, the check valve 16 is in an open position, and the plunger valve 24 is in a closed position. As the rod moves downwardly in response to pressure manually exerted on the knob 50, the valve plate 18 is pushed through the insert 80 and the valve chest 28 is pushed through the hole 83 of the annular plate 82. Correspondingly, the arms 34, 34' will slide downwardly through the arcuate slots 40 of the plunger plate 20 causing the plunger 21 to float upwardly until the plunger plate 20 makes contact with the valve plate 18, stopping the flow of dough from the hopper 11 through the cutouts 42 of the valve plate. The entire valve unit 14 will continue downwardly with the rod during which time the dough trapped within the valve chamber 12 will move from the valve chamber into the valve chest 28 through the top thereof for discharge. As the plunger 21 floats upwardly, the plunger valve 24 disengages the beveled edge 75 of the dough former 72, i.e., the plunger valve 24 opens, allowing the dough isolated in the valve chest 28 to enter the well 73 of the dough former 72. Dispensing will continue through the arms 74 of the dough former 72 until the upper end of the sleeve 60 has bottomed against the knob 50 as determined by the setting of the dial 70. If the knob 50 is then released to permit the now compressed spring 52 to return the rod, the plunger valve 24 will snap closed, stopping the flow of dough into the dough former 72 because of the partial vacuum condition beneath the check valve 16 caused by the upward movement of the rod 30. At the same time, the check valve 16 will snap open as the plunger plate 20 separates from the valve plate 18 allowing dough to pass through the cutouts 42 of the valve plate.

If the knob 50 is not released at the end of the down stroke, the weight of the plunger valve 24 and its related assembly will cause it to drop by the force of gravity back into its closed position with respect to the dough former 72. In either case, as the rod 30 makes its return stroke, the check valve 16 will be open so that the valve chamber 12 can be automatically replenished with dough from the hopper. The cycle is completed when the collar 84 reaches the sleeve 60 and the upward movement of the rod 30 is terminated.

It will be appreciated that in the alternative embodiment, the dough dispenser operates and the dough is dispensed in virtually the same manner, except that the dough is ultimately expelled from the valve chest 28' through the discharge opening 19 in a single charge.

While the preferred embodiment of the invention has been illustrated and described, it will be appreciated that various changes can be made therein without departing from the spirit and scope of the invention. For example, a flange or set of legs can be attached to the bottom of the discharge cylinder 13 for steadying and balancing the dispenser 10 on a flat surface.

The embodiments of the invention in which an exclusive property or privilege is claimed are defined as follows:

1. An apparatus for dispensing dough comprising:

a hopper for storing the dough, wherein the hopper narrows at its bottom to form a discharge chute into which the dough is metered;

a plate coupled to a lower end of the discharge chute, the plate having a hole through its center;

a reciprocating dispensing rod having an upper end and a lower end, the dispensing rod extending through the center of the hopper;

a valve unit carried by the reciprocating dispensing rod and slidably mounted within the discharge chute such that a valve chamber is defined between the valve unit, the discharge chute, and the plate, the valve unit including:

a) a valve chest that reciprocates through the hole defined through the plate in unison with the dispensing rod, the valve chest having:

i) an inlet fluid communication with the valve chamber;

ii) an outlet through which dough is discharged; and iii) a pair of integrally formed, opposing arms each arm including a shoulder which extends upwardly from an upper end of the valve chest;

b) a valve plate attached to the lower end of the dispensing rod, the valve plate having:

i) a pair of cutouts through which dough from the hopper is metered into the valve chamber; and ii) a pair of radial arm slots through which the arms of the valve chest extend; and c) a plunger that floats between the upper end of the valve chest and the valve plate, the plunger including:

i) a plunger valve housed within the valve chest for metering the discharge of dough through the outlet of the valve chest;

ii) a plunger plate having a pair of radial arm slots through which the arms of the valve chest extend, wherein the plunger plate rides on the shoulders of the arms of the valve chest between the upper end of the valve chest and the valve plate such that the plunger plate and the valve plate cooperate to meter the flow of dough from the hopper into the valve chamber, and from the valve chamber into the valve chest; and iii) a plunger stem extending upwardly from the plunger valve and terminating at the plunger plate.

2. An apparatus for dispensing dough comprising:

a hopper for storing the dough, wherein the hopper narrows at its bottom to form a discharge chute into which the dough is metered;

a plate coupled to a lower end of the discharge chute, the plate having a hole through center;

a reciprocating dispensing rod having an upper end and a lower end, the dispensing rod extending through the center of the hopper;

a valve unit carried by the reciprocating dispensing rod and slidably mounted within discharge chute such that a valve chamber is defined between the valve unit the discharge chute and the plate, the valve unit including:

a) a valve chest that reciprocates through the hole defined through the plate in unison with the dispensing rod the valve chest having:

i) an inlet in fluid communication with the valve chamber;

ii) an outlet through which dough is discharged; and iii) a pair of integrally formed, opposing arms, each arm including a shoulder which extends upwardly from an upper end of the valve chest, and a hook being mounted upon the shoulder of each arm such that the hook of one arm faces in the direction opposite the hook of the opposing arm;

b) valve plate attached to the lower end of the dispensing rod the valve plate having:

i) a pair of cutouts through which dough from the hopper is metered into the valve chamber; and ii) pair of arm slots through which the arms of the valve chest extend; and c) a plunger that floats between the upper end of the valve chest and the valve plate, the plunger including:

i) a plunger valve housed within the valve chest for metering the discharge of dough through the outlet of the valve chest:

ii) a plunger plate having a pair of arm slots through which the arms of the valve chest extend, wherein the plunger plate rides on the shoulders of the arms of the valve chest between the upper end of the valve chest and the valve plate such that the plunger plate and the valve plate cooperate to meter the flow of dough from the hopper into the valve chamber, and from the valve chamber into the valve chest; and iii) a plunger stem extending upwardly from the plunger valve and terminating at the plunger plate.

3. The apparatus of claim 2, further comprising a clip for attaching the dispensing rod to the valve unit, each end of the clip extending through the hook of each arm of the valve chest such that the ends of the clip bear against the arms in opposing directions.

4. The apparatus of claim 2, further comprising a dough former coupled to the outlet of the valve chest, the dough former including:

a body surrounding a well for receiving dough, the body including an upper edge that cooperates with the plunger valve housed within the valve unit to meter dough into the well; and at least one dispensing arm extending outwardly from the body, the dispensing arm being in fluid communication with the well, and the dispensing arm including a dispensing duct through which the dough travels and a discharge opening through which the dough is discharged.

5. The apparatus of claim 4, the check valve being closed when the dispensing rod plunger plate floats up against the valve plate and the plunger valve engages the upper edge of the dough former and stops the flow of dough into the well.

6. The apparatus of claim 5, the dough former including a plurality of dispensing arms extending outwardly from the body that are in fluid communication with the well.

7. The apparatus of claim 2, the outlet of the valve chest being provided with a seat having a discharge opening defined through its center, the seat cooperating with the plunger valve of the valve unit to discharge dough through the discharge opening.

8. The apparatus of claim 2, the discharge chute being reinforced by a supportive insert mounted within the discharge chute.

9. The apparatus of claim 8, further comprising a handle assembly through which the rod extends and is centered within the hopper, the handle assembly including:

a handle having an opening through which the rod extends; and a pair of supporting rods extending downwardly from either end of the handle and terminating in the insert mounted to the discharge chute.

10. The apparatus of claim 9, further comprising a sleeve through which the dispensing rod is journalled for reciprocating movement.

11. The apparatus of claim 10, the dispensing rod being secured to the handle assembly by a locking mechanism including:

a guiding ring mounted near the upper end of the sleeve, the guiding ring being intersected by a slot;

a locking ring mounted on the guiding ting, the locking ring having a locking tab disposed at a point along its circumference which extends downwardly through the slot of the guiding ring and a channel intersecting the opening of the handle of the handle assembly; and a key mounted to the sleeve at a distance slightly greater than a thickness of the handle.

12. The apparatus of claim 11, further comprising a knob mounted to the upper end of the dispensing rod.

13. The apparatus of claim 12, further comprising a spring seated between the knob and the locking mechanism for yieldingly resisting the reciprocating movement of the dispensing rod.

14. The apparatus of claim 12, the knob including:

a dial rotatable about the dispensing rod;

a depending pin for selectively nesting in a plurality of radial grooves provided by the dial, the radial grooves being evenly spaced about the dial at depths varying in a nonlinear progression.

15. The apparatus of claim 10, the dispensing rod being secured to the handle assembly by a locking mechanism including:

a guiding ring mounted near the upper end of the sleeve, the guiding ring including a slot;

a locking ring mounted on the guiding ring, the locking ring having a locking tab disposed at a point along its circumference which extends downwardly through the slot of the guiding ring and a channel intersecting the opening of the handle of the handle assembly; and a key mounted to the sleeve at a distance slightly greater than a thickness of the handle.

16. The apparatus of claim 2, wherein the discharge chute is reinforced.

17. An apparatus for dispensing dough comprising:

a hopper for storing the dough, wherein the hopper narrows at its bottom to form a reinforced discharge chute into which the dough is metered;

a plate coupled to a lower end of the discharge chute, the plate including a hole through its center, a dispensing rod having an upper end and a lower end, the dispensing rod extending through the center of the hopper and mounted for reciprocating movement;

a valve unit carded by the dispensing rod and slidably mounted within the discharge chute such that a valve chamber is defined between the valve unit, the discharge chute and the plate, the valve unit including:

a) a valve chest that reciprocates through the hole defined through the plate, the valve chest having:

i) an inlet in fluid communication with the valve chamber;

ii) an outlet through which dough is discharged; and iii) a pair of integrally formed, opposing arms which extend upwardly from an upper end of the valve chest, each arm including a hook mounted upon a shoulder, the hook of one arm facing in a direction opposite the hook of the opposing arm;

b) a check valve that alternatively opens and closes in response to the reciprocating movement of the dispensing rod, the check valve including:
   i) a valve plate attached to the lower end of the dispensing rod, the valve plate having a pair of cutouts through which dough from the hopper is metered into the valve chamber and a pair of arm slots through which the arms of the valve chest extend; and
   ii) a plunger plate having a pair of arm slots through which the arms of the valve chest extend, the plunger plate floating between the upper end of the valve chest and the valve plate, the check valve being closed when the plunger plate engages the valve plate and covers the cutouts of the valve plate, and the check valve being open when the plunger plate is separated from the valve plate;
c) a plunger stem extending downwardly from the plunger plate and terminating at a plunger valve housed within the valve chest, a length of the plunger stem being less than a distance between the valve plate and the outlet of the valve chest so that the plunger plate floats between the upper end of the valve chest and the valve plate and the check valve can alternatively open and close; and
a dough former coupled to the outlet of the valve chest, the dough former including:
   a) a body surrounding a well for receiving dough from the outlet of the valve chest, the body including an upper edge that engages the plunger valve of the plunger to close the outlet of the valve chest when the check valve is closed; and
   b) at least one dispensing arm extending outwardly from the body that is in fluid communication with the well.

18. The apparatus of claim 17, further comprising a clip for attaching the dispensing rod to the valve unit, each end portion of the clip extending through the hook of each arm of the valve chest such that the end portions of the clip bear against the arms in opposing directions.

19. The apparatus of claim 17, the dispensing arm including a dispensing duct through which the dough travels and a discharge opening through which the dough is discharged.

20. The apparatus of claim 19, the dispensing arm being inclined at a predetermined angle.

21. The apparatus of claim 20, the dough former including a plurality of dispensing arms extending outwardly from the body that are in fluid communication with the well.

22. The apparatus of claim 17, the discharge chute being reinforced by a supportive insert mounted within the discharge chute.

23. The apparatus of claim 22, further comprising a handle assembly through which the rod extends and is centered within the hopper, the handle assembly including:
   a handle having an opening through which the rod extends; and
   a pair of supporting rods extending downwardly from either end of the handle and terminating in the insert mounted to the discharge chute.

24. The apparatus of claim 23, further comprising a sleeve through which the dispensing rod is journalled for reciprocating movement.

25. The apparatus of claim 24, wherein the dispensing rod is secured to the handle assembly by a locking mechanism including:
   a guiding ring mounted near the upper end of the sleeve, the guiding ring being intersected by a slot;
   a locking ring mounted on the guiding ring, the locking ring having a locking tab disposed at a point along its circumference which extends downwardly through the slot of the guiding ring and a channel intersecting the opening of the handle; and
   a key mounted to the sleeve at a distance slightly greater than a thickness of the handle.

26. The apparatus of claim 25, further comprising a knob mounted to the upper end of the dispensing rod.

27. The apparatus of claim 26, further comprising a spring seated between the knob and the locking mechanism for yieldingly resisting the reciprocating movement of the dispensing rod.

28. The apparatus of claim 24, wherein the dispensing rod is secured to the handle assembly by a locking mechanism including:
   a guiding ring mounted near the upper end of the sleeve, the guiding ring including a slot;
   a locking ring mounted on the guiding ring, the locking ring having a locking tab disposed at a point along its circumference which extends downwardly through the slot of the guiding ring and a channel intersecting the opening of the handle; and
   a key mounted to the sleeve at a distance slightly greater than a thickness of the handle.

29. The apparatus of claim 17, wherein the discharge chute is reinforced.

30. In a dough dispenser having a hopper, a valve chamber into which dough is metered from the hopper, the valve chamber including an inlet and an outlet, a dispensing rod extending through the hopper and mounted for reciprocating movement, and a valve unit for discharging dough from the valve chamber, the valve unit being carried by the dispensing rod and slidably mounted in the outlet, an apparatus coupled to the valve unit for dispensing the dough in multiple portions, the apparatus comprising:
   a body surrounding a well for receiving dough discharged from the valve unit, the body including an upper edge that cooperates with the valve unit to meter dough into the well; and
   at least one dispensing arm extending outwardly from the body that is in fluid communication with the well.

31. The apparatus of claim 30, the dispensing arm including a dispensing duct through which the dough travels and a discharge opening through which the dough is discharged.

32. The apparatus of claim 31, the dispensing arm being inclined at a predetermined angle.

33. The apparatus of claim 30, further comprising a plurality of dispensing arms extending outwardly from the body and being in fluid communication with the well.

34. An apparatus coupled to a dough dispenser for dispensing dough in multiple portions, the apparatus comprising:
   a body surrounding a well for receiving dough discharged from the dough dispenser, the body including an upper edge that cooperates with the lower end of the dough dispenser to meter dough into the well; and
   at least one dispensing arm extending outwardly from the body that is in fluid communication with the well.

35. The apparatus of claim 34, the dispensing arm including a dispensing duct through which the dough travels and a discharge opening through which the dough is discharged.

36. The apparatus of claim 35, the dispensing arm being inclined at a permanent angle.

37. The apparatus of claim 36, further comprising a plurality of dispensing arms extending outwardly from the body and being in fluid communication with the well.

* * * * *

UNITED STATES PATENT AND TRADEMARK OFFICE
CERTIFICATE OF CORRECTION

PATENT NO. : 5,645,195
DATED : July 8, 1997
INVENTOR(S) : T.E. Belshaw et al.

It is certified that error appears in the above-indentified patent and that said Letters Patent is hereby corrected as shown below:

| COLUMN | LINE | |
|---|---|---|
| On the title page: | Item | |
| [76] Pg. 1, col. 1 | Inventors | "45th Ave. SW.," should read --45th Ave. S.W.,-- |
| [76] Pg. 1, col. 1 | Inventors | "634 NW." should read --634 N.W.-- |
| 8 (Claim 1, | 22 line 18) | After "inlet" insert --in-- |
| 8 (Claim 1, | 25 line 21) | After "arms" insert --,-- |
| 8 (Claim 2, | 60 line 11) | After "within" insert --the-- |
| 8 (Claim 2, | 65 line 16) | After "rod" insert --,-- |
| 9 (Claim 2, | 8 line 26) | After "b)" insert --a-- |
| 9 (Claim 2, | 9 line 27) | After "rod" insert --,-- |
| 9 (Claim 2, | 11 line 30) | After "ii)" insert --a-- |
| 10 (Claim 11, | 12 line 6) | "ting" should read --ring-- |

UNITED STATES PATENT AND TRADEMARK OFFICE
CERTIFICATE OF CORRECTION

PATENT NO. : 5,645,195
DATED : July 8, 1997
INVENTOR(S) : T.E. Belshaw et al.

It is certified that error appears in the above-indentified patent and that said Letters Patent is hereby corrected as shown below:

| COLUMN | LINE | |
|---|---|---|
| 10 (Claim 17, | 54 line 10) | "carded" should read --carried-- |
| 11 (Claim 17, | 24 line 48) | "dose" should read --close-- |
| 11 (Claim 18, | 36 line 3) | "dip" should read --clip-- |
| 11 (Claim 25, | 66 line 6) | "ting" should read --ring-- |
| 12 (Claim 30, | 31 line 6) | "carded" should read --carried-- |

Signed and Sealed this

Sixth Day of January, 1998

Attest:

BRUCE LEHMAN

Attesting Officer

Commissioner of Patents and Trademarks